United States Patent
Fletcher et al.

(10) Patent No.: US 8,589,727 B1
(45) Date of Patent: Nov. 19, 2013

(54) METHODS AND APPARATUS FOR PROVIDING CONTINUOUS AVAILABILITY OF APPLICATIONS

(75) Inventors: Robert Adam Fletcher, Dunblane (GB); Scott Cumming, Winchburgh (GB); Cristian Libotean, Cluj Napoca (RO); Mihai Cozma, Cluj County (RO); Stuart Moore, Callander (GB); Thomas Stones, Dunblane (GB)

(73) Assignee: Neverfail Group Limited, Berkshire (GB)

( * ) Notice: Subject to any disclaimer, the term of this patent is extended or adjusted under 35 U.S.C. 154(b) by 0 days.

(21) Appl. No.: 12/365,893

(22) Filed: Feb. 4, 2009

Related U.S. Application Data

(60) Provisional application No. 61/025,958, filed on Feb. 4, 2008.

(51) Int. Cl.
*G06F 11/00* (2006.01)
(52) U.S. Cl.
USPC .............................................. 714/13; 714/15

(58) Field of Classification Search
USPC ...................................... 714/10–13, 15, 16, 1
See application file for complete search history.

(56) References Cited

U.S. PATENT DOCUMENTS

| | | | |
|---|---|---|---|
| 7,320,088 B1* | 1/2008 | Gawali ............................. | 714/6 |
| 2004/0088396 A1* | 5/2004 | Hammons et al. ............ | 709/223 |
| 2005/0120025 A1* | 6/2005 | Rodriguez et al. .............. | 707/10 |
| 2008/0307258 A1* | 12/2008 | Challenger et al. ............ | 714/20 |
| 2009/0063501 A1* | 3/2009 | Buckler et al. .................. | 707/10 |

* cited by examiner

*Primary Examiner* — Dieu-Minh Le

(57) ABSTRACT

Methods and apparatus for providing continuous availability include communicatively coupling a first node and a second node, each having at least one processor, an executing application management framework, and a first application. The first node is executing its associated first application. A plugin for the first node application management framework is executed. The plugin is dynamically loadable by the application management framework. The plugin specifies application availability rules for protecting the availability of the first application.

26 Claims, 13 Drawing Sheets

METHODS AND APPARATUS FOR PROVIDING CONTINUOUS AVAILABILITY OF APPLICATIONS

CROSS-REFERENCE TO RELATED APPLICATIONS

This application claims the benefit of U.S. Provisional Patent Application No. 61/025,958 of Fletcher, et al. filed Feb. 4, 2008 that is incorporated herein by reference in its entirety.

TECHNICAL AREA

This disclosure is drawn to computer systems. In particular, this invention is drawn to methods and apparatus for providing high or continuous availability of end-user applications.

BACKGROUND

The use of computers has become vital to the operation of many government, business, and military operations. Loss of computer availability can disrupt operations resulting in degraded services, loss of revenue, and even risk of human casualty.

For example, disruption of financial systems, electronic messaging, mobile communications, and internet sales sites can result in loss of revenue. Disruption of an industrial process control system or health care system may result in loss of life in addition to loss of revenue. Some applications can accommodate an occasional error or short delay but otherwise require high availability, continuous availability or fault tolerance of a computer system. Other applications, such as air traffic control and nuclear power generation, may incur a high cost in terms of human welfare and property destruction when computers are not available to perform the intended processing purpose.

The classifications of high availability, continuous availability and fault tolerance may be further defined in terms of recovery point objective and recovery time objective. Recovery point objective is a measure of the amount of data loss that a system can support. Recovery time objective is a measure of the allowable downtime for a computer system after a fault.

A fault tolerant system has a relatively short recovery time objective and a recovery point objective of zero such that no loss of data is experienced. A continuously available system likewise has a relatively short recovery time objective, however, the recovery point can be non-zero because a limited amount of data loss is tolerable. The "continuous availability" is from the perspective of the end-user.

One approach for providing continuous availability relies upon a proprietary operating system running on commercially available hardware. Another approach relies upon the use of a commercially available operating system running on proprietary hardware systems. One disadvantage of such approaches is that the application may need to be tailored to the proprietary operating system or the proprietary hardware. The use of proprietary hardware or operating system software tends to increase the cost of implementation particularly as the application is scaled to handle more users or a greater throughput.

SUMMARY

Methods and apparatus for providing continuous availability include communicatively coupling a first node and a second node, each having at least one processor, an executing application management framework, and a first application. The first node is executing its associated first application. A plugin for the first node application management framework is executed. The plugin is dynamically loadable by the application management framework. The plugin specifies application availability rules for protecting the availability of the first application.

Another method includes communicatively coupling a first node and a second node, each having at least one processor, an executing application management framework, and a first application. The first node is executing its associated first application. A plugin for the first node application management framework is executed. The plugin is dynamically loadable by the application management framework. The plugin specifies application data associated with the first application for protection.

In various embodiments, the plugin contains definitions and executable code for one or more of the application data, application data discovery, application services, application dependent services, application service discovery, application availability tasks, application availability rules, and pre-install checks.

BRIEF DESCRIPTION OF THE DRAWINGS

Embodiments of the present invention are illustrated by way of example and not limitation in the figures of the accompanying drawings, in which like references indicate similar elements and in which.

DETAILED DESCRIPTION

Figure 1:
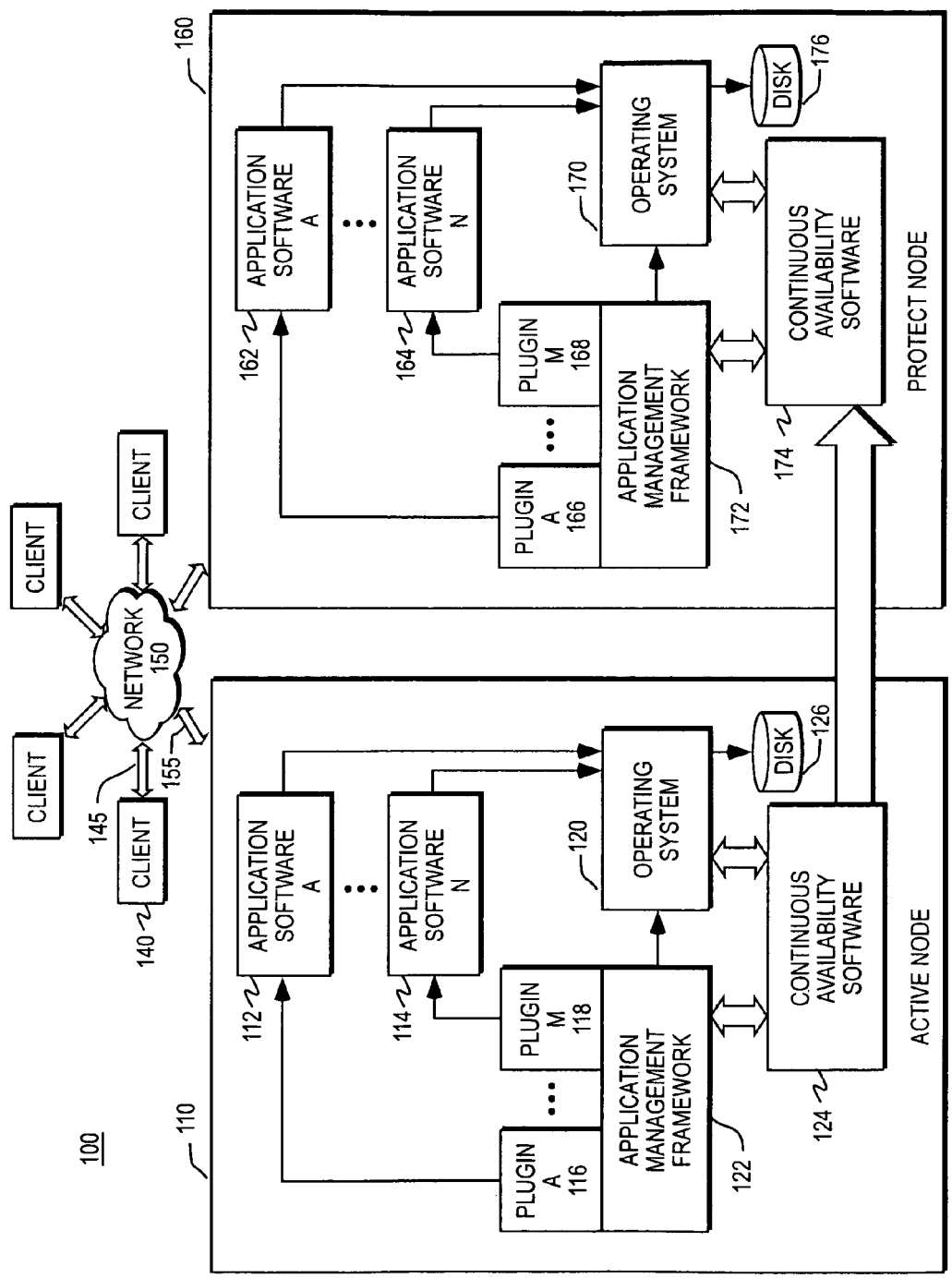
FIG. 1 illustrates one embodiment of an application management framework in the context of a two node continuous availability system.

Computer systems may be used to collect, process, generate, exchange, and store information. The architecture of a particular system may be dependent upon the application(s) utilizing the computer system. For example, applications may be designed for metrics such as speed, number of users, reliability, availability, etc. There are often design tradeoffs between architectures optimized for one metric and architectures optimized for a different metric. A number of definitions are provided before proceeding further to describe "continuous availability".

A recovery point objective (RPO) defines the maximum amount of data loss that a computer-based system is expected to protect against in the event of a failure. RPO may be characterized in terms of length of time prior to the failure. An RPO of one hour implies that the computer system should not lose more than the one hour worth of data collected, processed, generated, exchanged, or stored in the timeframe immediately preceding the failure.

A recovery time objective (RTO) defines the maximum amount of time that a computer-based system requires to recover so that it is available after a failure. An RTO of one hour implies that the computer system should be available to continue operations no more than one hour following the failure.

A "high availability" (HA) computer-based system guarantees that data loss will not exceed a maximum amount as defined by the RPO and that the amount of downtime will not exceed a maximum amount as defined by the RTO. A high availability system thus has defined upper bounds for loss of data and downtime due to failure.

A "fault tolerant" computer system is a high availability system where the RPO is zero (i.e., no data loss) and the RTO is typically on the order of minutes or less. In one embodiment, for example, a fault tolerant system provides an RTO of two minutes or less. A fault tolerant system prioritizes protection from loss of data and provides a continuous availability service to end users.

A computer system offering "continuous data protection" (CDP) provides a defined RPO (that may be zero) without a defined RTO. Thus data may be replicated for protection but recovery of the system may be manual.

A "continuous availability" (CA) system is an HA system where the amount of data loss as defined by the RPO and the amount of downtime as defined by the RTO are such that end users perceive the system to be continuously available even though a fault may have occurred. Continuous availability implies an RPO on the order of seconds and an RTO on the order of minutes. In one embodiment, for example, a continuous availability system has an RPO of five seconds or less and an RTO of two minutes or less such that the end user will not give up trying to use the system before it becomes available again and so the CA system is effectively continuously available to the end user. A continuous availability system prioritizes availability to end users. A "fault tolerant" system is a special case of a continuously available system. Fault tolerant and continuous availability systems are subsets of high availability computer systems based upon defined RPO and RTO.

"Application data" refers to the data associated with an application that must be protected if the application is to support high availability. Protection generally means that a second copy of the data needs to be maintained. Application data includes content on nonvolatile storage that the application relies upon. This may include, for example, files utilized by the application, file system data used to store files needed by the application, and files maintaining configuration data for the application. Such configuration data may be located in a Windows® registry, for example, if the computer system is utilizing the Microsoft Windows® operating system.

An "application file filter" ("file filter") defines a subset of the file system that is contained in the application data. The expression can use wildcards, filenames, pathnames, and inclusion/exclusion operators to define what is included and excluded from the application data.

An "application registry file" ("registry filter") defines a subset of a Windows® registry that is contained in the application data. The expression can use wildcards, filenames, pathnames, and inclusion/exclusion operators to define what is included and excluded from the application data.

An "application data filter" ("filter") is a generic term for application file filter or application registry filter.

"Application data discovery" is an executable function used to detect dynamic changes to application data filters. For example, an application may add a new database located in a different part of the file system. The application data discovery function identifies the new application data and add a filter to incorporate it into the application data.

A "computer node" ("node") is a computer system. A node can be a client computer or server computer in a client-server architecture. A node can be a physical or virtual computer.

"Software Service" is executable code similar to a daemon under the Unix® operating system. A software service is executable program code that is designed not to require user intervention but which can be started, stopped, or paused and which may rely upon other software services. Accordingly, software services may have to be started in a particular order determined by dependencies. "Application services" are software services associated with a specific application. "Application dependent services" is the set of software services that an application is dependent upon to run. This includes the application's own software services (i.e. its application services), and any required software services that are part of the operating system or third party applications. "Application service dependencies" refers to the dependencies between application dependent services. These include rules governing the order to start and stop application dependent services.

"Application service discovery" is an executable function for determining dynamic changes in the set of software services comprising an application. For example, an administrator may create a new instance of an existing application that results in the creation of one or more new application services.

An "active node" is a computer node on which one or more applications are running.

A "protect node" is a computer node associated with a specific active node. The protect node acts as a standby node for the associated active node with respect to one or more of the applications running on the active node.

A "protected node group" is a group of two or more computers that include an active node and at least one protect node associated with the active node. An active node and a protect node are the smallest set of nodes forming a protected node group. The active node executes the protected application. In the event of a failure, the active node ceases execution of the application and the protect node begins executing the application with an instance of the application data. The instance of the application and application data can either be one held on disks shared between the active and protect node. Alternatively, the instances of the application and application data can be instances that have been replicated between disks used by the active node to disks used by the protect node.

A "protected application" is an application running on an active node of a protected node group. High availability support is supported for at least the protected application through the protected node group.

A "failover" entails substituting the functionality of a protected application executing on an active node with a copy of the application executing on a protect node after some failure on the active node has been detected, inferred, or predicted. The failure may relate to software or hardware of the active node. Upon failover, the protect node becomes the current active node. A failover can be initiated by the active node or an associated protect node. The failover may be triggered by an actual, apparent, or anticipated failure of the applications, operating system or hardware associated with the active node.

A "switchover" is similar to a failover in that a protect node becomes the active node responsible for executing a protected application. Execution of one or more protected applications with their associated application data is moved from an active node to a protect node. A switchover is co-ordinated between the active and protect nodes to avoid a loss of data. A switchover is typically initiated manually to allow for software or hardware maintenance to be performed on the former active node.

A "switchback" is the process of switching back from the current active node to the former active node. A switchback may be performed after a failover or switchover to restore the individual nodes of a protected node group to their original active and protect status.

"Disaster recovery" refers to a high availability system that is capable of supporting failure of computer infrastructure at a specific location. In order to accommodate disaster recovery, data protection may entail replication of application data to a remote location in order to reduce susceptibility to a site-specific failure such as fire, loss of power, or other catastrophe.

An "application availability rule" may include executable code and definitions that describes conditions necessary for and actions required to protect an application. For example, a rule having the condition "CPU usage >95% for 30 minutes" may be associated with an action of "failover". The action is triggered depending upon whether the conditions set forth in the rule are met. Rule conditions typically have a "true" or "false" result. If true then the action is invoked. Typical actions include sending an alert, performing an application availability task (which can trigger another rule), restarting one or more software services, and failover.

An "application availability task" is a sequence of actions that must be performed in order to achieve a specific goal such as starting or stopping a particular application, a software service, or individual components of a computer system.

A "pre-install check" is a check made to validate that the application management framework will be able to provide high availability support for a specific application. One example of such a check is a verification that the application is installed and is a version with no known major faults. A further example is that there is sufficient free disk space for any overhead incurred in providing high availability for the application.

An "application management framework" (AMF) is processor-executable instructions responsible for supporting high availability for specific applications executing on one or more active nodes. Ideally, an application management framework should protect applications without the need to make changes to the applications.

A "plugin" is processor-executable code that may be dynamically loaded and unloaded (e.g., by the application management framework). A plugin contains the executable code and information needed to provide continuous availability support for an application. A plugin contains definitions for one or more of the application data, application services, application dependent services, application availability tasks, application availability rules, and pre-install checks for the application. The plugin includes executable functions supporting these definitions. The plugin may also include the executable functions for application data discovery and application service discovery.

"Plugin resources" are functional components of a plugin that may be common between multiple plugins. Plugin resources include file filters, registry filters, software services, application availability tasks, and application availability rules.

"Application sponsorship" is a technique utilized by the Application Management Framework to track plugin resources that may be shared by multiple plugins. This technique enables the Application Management Framework to determine if the resources are needed according to what applications are currently executing. In addition, this permits dependencies between resources to be maintained and enforced by the Application Management Framework. One example of such a dependency is the order in which application availability tasks used to start applications on a node are performed. An "application sponsor" is the name used by the Application Management Framework to track shared plugin resources.

"Continuous availability software" is processor executable code that is capable of providing the operational components of a computer system supporting continuous availability. These components include one or more of: file replication, registry replication, failover, switchover, switchback, disaster recovery, application management framework. In one embodiment, the continuous availability software includes a graphical user interface to support this functionality.

FIG. 1 illustrates one embodiment 100 of the Application Management Framework 122, 172 in the context of a two node continuous availability system. A "node" is a computer system. A node can be a client computer or server computer in a client-server architecture. A node can be a physical or virtual computer. The two node system forms an active/protect distributed computer group using replication of data from a first node (active node) to a redundant second node (protect node) to enable continuous availability of applications on the first node in the event of any failure associated with the first node.

The system comprises two nodes that show interactions of application software 112, 114, 162, 164, Application Management Framework 122, 172, continuous availability software 124, 174, and disk 126, 176. Although continuous availability systems may include two or more nodes that can be a mixture of multiple active and protect nodes, the system shown 100 is one of the simplest embodiments formed by two nodes. A first node is designated as an active node 110. A second node is designated as the protect node 160. The first and second nodes are interconnected via a secondary network connection 130.

The Application Management Frameworks 122, 172 are elements of a continuous availability system that provides adaptive protection for multiple applications 112, 114, 162, 164. The nodes 110, 160 may have connections 155 to a network 150 for providing services to client computers 140 having connections 145 to the network 150. The network 150 may be a local area network or a wide area network, such as the Internet. Each of the two node computers 110, 160 may be connected to the network 150 via standard hardware and software interface connections 155. The active node 110 serves as a primary node while the protect node 160 acts as a standby node to the active node 110. The protect node may become active in the event of a failover or switchover. The protect node may be located at a geographically remote location to support disaster recovery.

The active node 110 is executing application software A-N (112-114). The active node is configured by the continuous availability software 124 to be visible via network connections 155 to application client computers 140. The continuous availability software 124 on the active node 110 intercepts all write operations to the disk 126 by the application software 112-114 using facilities provided by the operating system 120. The continuous availability software 124 on the active node 110 also sends these write operations to the continuous availability software 174 on the protect node 160 using the secondary network connection 130. The continuous availability software 174 on the protect node 160 executes the same write operations to the disk 176 on the protect node 160 in the same order as those on the active node 110. The continuous availability software 174 on the protect node 160 also hides the protect node 160 from application client computers 140 by using facilities provided by the operating system 170 on the protect node 160.

The two node system 100 shown in FIG. 1 provides continuous availability by detecting failures of the currently active node 110, and responding by enabling the client network connection 155 on the protect node 160 of the two node pair and starting application software A-N 162, 166 on the protect node 176, where they will begin using the replicated data on the disk 176 on the protect node. The continuous availability software 124 on the active node 110 then hides the active node 110 from application client computers 140 by using facilities provided by the operating system 120 on the active node 110. This operation is termed a "failover".

For certain types of failure, the first node 110 (original active node) may still be present and capable of acting as a protect node, and the application data from the application software 162, 166 on the second node 160 (original protect node) will be replicated in the other direction to the continuous availability software 124 on the first node 110, which stores the application data from the second node 160 on the disk 126 of the first node 110. The continuous availability system 100 shown in FIG. 1 may also comprise more than two nodes, whereby one is active and the others are standby nodes. The standby nodes will receive application data for replication from the active node.

The Application Management Framework 122, 172 provides the continuous availability software 124, 174 with a definition of what application data needs to be protected. Replication to another location is one method of protecting the application data. The continuous availability software 124, 174 instructs the Application Management Framework 122, 172 to start or stop the application software 112-114, 162-164 in response to startup, shutdown, switchover or failover operation. The Application Management Framework 122, 172 also monitors the state of the applications 112-114, 162-164 and can attempt to restart one or more of the applications 112-114, 162-164 or can request that the continuous availability software 124, 174 perform a failover, depending on the outcome of the monitoring.

The Application Management Framework can load one or more plugins 116-118, 166-168 either on startup or during operation. Each plugin A-M (116-118, 166-168) is associated with a particular application (112-114, 162-164). Each application needs a plugin to define the characteristics necessary to protect the application for continuous availability from the perspective of the end user. Thus if M<N (excluding any plugins designated for the operating system or other non-application monitoring functions) then one or more applications will not have protection. The plugin identifies the application data, the application services, the application dependent services used by the associated protected application. The plugin also determines the state of health of the application through application availability tasks and application availability rules.

Applications may be either "protected" or "unprotected". In this example data associated with protected applications is replicated to a protect node. Data associated with unprotected applications is not replicated. The use of plugins allows the Application Management Framework to accommodate changes in the data replication requirements of protected applications during their execution. The dynamically loadable nature of the plugins allows for the addition or removal of application protection without stopping the continuous availability software or the protected applications.

Another significant feature of the Application Management Framework is in resolving potential overlaps in the data protection and management requirements of multiple protected applications. Applications that co-exist on the same node are typically related. For example, a web application, mail application and database application may all run on the same node and share data and may have software services in common. The Application Management Framework employs the concept of "application sponsorship", in which potentially shared plugin resources such as protected data definitions and software services are "sponsored" by one or more protected applications.

The Application Management Framework allows all of the protection requirements for an application to be defined as executable code in a plugin 116-118, 166-168, that can be dynamically loaded and unloaded from the Application Management Framework 122, 172 during operation. These protection requirements may include application data to replicate, software services to monitor, and any additional monitoring rules. This is an essential aspect of providing the adaptability described above. These features are also essential in allowing rapid development as well as testing and distribution of new and modified plugins without alteration of the associated application software 112-114 and 162-164, application management framework 122, 172, and continuous availability software 124, 174. Furthermore, plugins are used to define the application sponsorship described above.

The Application Management Framework is non-invasive with regard to the applications that are protected. For example, no changes are required to the code of protected applications. Instead, the plugin may be regarded as an agent acting on behalf of the associated application to define all of the requirements for providing continuous availability to the applications using the continuous availability software. Plugins can also define dependencies between the order in which software services are started and stopped on a node. The ordering may be accomplished through the Application Management Framework using on-demand starting of the application services.

The events in the Application Management Framework 122, 172 that can cause a failover request to be sent to the continuous availability software 124, 174 may be configured by a user, since a user may configure what actions are taken in response to rules triggering. Several "built-in actions" that may be selected include logging and alerting a warning, restarting an application, and requesting a failover. By default, the actions are set to logging and alerting warning. The user must configure a more drastic response. Both plugins and the user may define further actions that may be configured in response to rules triggering. The most likely rules for which a failover response is appropriate are those that detect a failure of the node or network hardware of the currently active node.

For example, an operating system plugin containing various application availability rules may include a check that hard disks are writable. This check is intended to detect failure or problems with the hard disks. This is one likely candidate for which an application availability rule should trigger a failover action. Rules may have more than one action that is invoked if the rule condition is triggered.

Another example of a condition that may cause a failover request is that some resource of the currently active node is about to become exhausted, but there is still an abundance of that resource on a protect node. This is an example of anticipated failure. Examples of resources that may become exhausted include memory, disk space, disk utilization or processor utilization.

Other than an event within the Application Management Framework there may be system events that trigger a failover. A failover may be initiated by a protect node when it has failed to receive any communication from an active node for a configurable period. A failover may be initiated when an active node loses its network connection to its clients.

Figure 2:
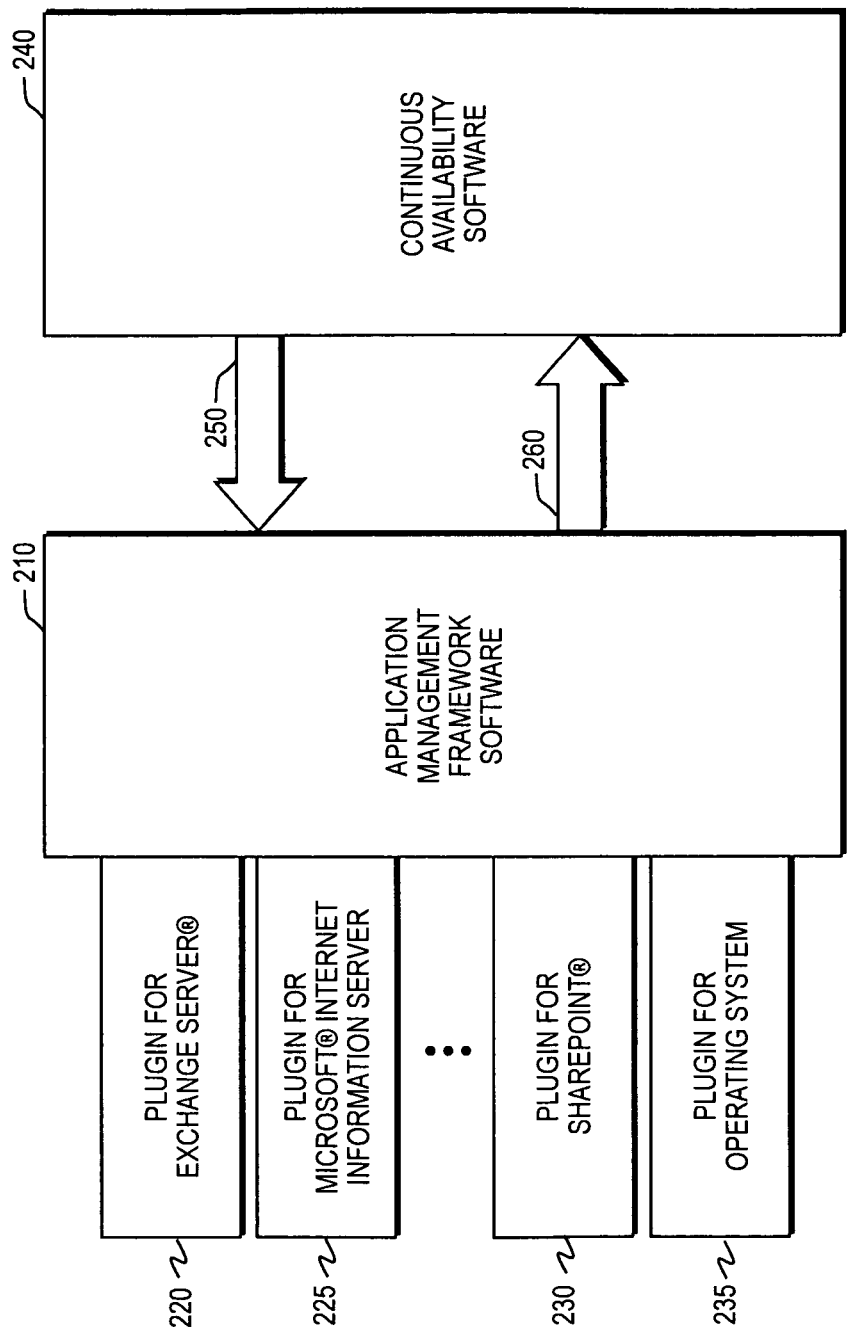
FIG. 2 illustrates one embodiment of an application management framework in communication with replication components.

FIG. 2 illustrates one embodiment of the application management framework in communication with replication components 200, and four example application management plugins 220, 225, 230, 235. The context in which the Application Management Framework 210 is used and various forms of communication 250, 260 with the associated continuous availability system components 240 are illustrated.

The Application Management Framework Software is instructed by the continuous availability software when to start or stop protected applications on an active node, typically due to switchover or failover of the active node. It is capable of installing or uninstalling plugins when initiated by an administrative user. It may be used during system setup and initialization as well as during run-time. It may also report the health of an application, request a failover of an active node due to a failure, report applications that have started and stopped, and optimize the definition of data to replicate. It is responsible for providing application file filters, application registry filters, application availability tasks, application availability rules, application dependent services and application service discovery.

The application management framework software 210 relies on plugins to define the application-specific information. The example plugins shown in FIG. 2 include a plugin for Microsoft® Exchange 220. Similarly, a plugin for Microsoft® Internet Information 225, a plugin for Share-Point® 230, and a plugin for the operating system 235.

Each plugin acts as an agent for defining the protection requirements of the associated application. A plugin may include such items as the name of an application being protected, dependencies on other software services, pre-install checks, application data discovery, application service discovery, application availability tasks and application availability rules. A plugin is a library of callback functions that may be dynamically loaded into and unloaded from the framework at run-time. A plugin contains all of the application-specific code and definitions for protecting a specific application. In particular, a plugin defines application data discovery functions for discovering the current set of file and registry filters defining the data associated with the protected application, the application dependent services, application availability rules, and application availability tasks. Plugins may be installed and uninstalled from the Application Management Framework without stopping an associated node. Plugins can also specify the order for starting or stopping application dependent services.

In an embodiment of the present invention, the plugins use the technique of function decorations in order to identify callback functions to the framework, and to define the text that should be used to present monitoring rules to the administrative-user, including any configurable parameters. Reflection, also known as introspection, is used when the plugin is loaded in order to query these attributes and identify the callback functions to the framework. Plugins also specify a textual name for the application that they are protecting. This is termed the "application sponsor".

The application management framework software 210 uses a concept of application sponsorship of shared resources by multiple applications that share services or filters. A shared service or filter exists only when at least one application sponsor for that resource exists. When a shared resource has no sponsors, it is removed. When an application is installed, the monitoring rules and tasks associated with an application are labeled with a hierarchical name, based on <sponsor>\<task> or <sponsor>\<rule>. This allows multiple plugins to define the same named task or rule independently without conflict.

When a plugin's protected data or service discovery callbacks are invoked by the plugin, all of the filters or services specified by the plugin are tagged with its sponsor name so that the framework can track sponsorship. Filters and services may have multiple sponsors. When a plugin is unloaded, then its sponsorship is withdrawn from all associated tasks, rules, filters and services. Only when a filter or service has no sponsors is it removed. Tasks and rules only have one sponsor, and so will be removed immediately when a sponsor is withdrawn.

The Application Management Framework will periodically invoke the protected data discovery callbacks of the current set of plugins. Each plugin will determine the current set of filters required to protect the application, e.g. by querying the application via an API, and will enumerate the required filters to the application management framework. The Application Management Framework tracks sponsorship of filters as described above. The Application Management Framework will compare all the requested filters, will validate them, e.g. to ensure the underlying storage device is available. Only valid filters will be deemed "effective". The Application Management Framework will also optimize file filters. The optimization of file filters uses a technique similar to the partial ordering of regular expressions. For example, if one filter is found to specify a subset of the protected data of another filter, only the more general filter is deemed to be effective. Furthermore, if multiple plugins sponsor the same filter, only one copy of the filter will be deemed to be effective. Once the Application Management Framework has determined the set of effective filters, then it only passes this set to the continuous availability software if this set has changed.

Plugins may choose to either explicitly add or remove sponsorship for filters or to enumerate them. The advantage of the latter is that they can be state-less in simply enumerating all filters required to protect the associated application at that point in time. Determining whether a filter has been added or removed, and could therefore affect the set of effective filters is thereby left to the Application Management Framework.

The Application Management Framework will periodically invoke the protected service discovery callbacks of the current set of plugins. Each plugin will determine the current set of application dependent services and will enumerate them to the application management framework. The plugin will also specify the desired state of the service on both active and protect nodes. Typically, this will be "running" on the active node and "stopped" on the protect node. The Application Management Framework will compare the set of services, and will report any conflicts in the required state. Where a protected service has not previously been protected by the application management framework, then if it currently starts automatically on node restart, it will be reconfigured to start on demand.

The Application Management Framework recursively traverses the services upon which protected services depend, and where such services are encountered for the first time with a "running" target state, the Application Management Framework will add them to the list of services for which it monitors their running/stopped state. The Application Management Framework will also recursively traverse the services that depend on protected services, and will alter the start type for services when they are first made known to the Application Management Framework from automatic to on-demand. The Application Management Framework will subsequently start and stop such dependent services when protected applications are started and stopped.

The Application Management Framework will periodically monitor that the protected services and the services on which they depend, as described above, are in their target running/stopped state on active and protect nodes. Where they are found not to be in the expected state, then a task is invoked. By default this task will be to attempt to start/stop the service as appropriate, but the administrative user may reconfigure this with an alternative action.

Plugins may define pre-start and post-start callbacks that will be executed by the application management framework before and after, respectively, it started protected services. Where protected services have dependencies between them, then this will determine the order in which services are started and stopped. However, in the absence of such dependencies, then where plugins have specified the sponsor name of an application should be started before them or after them, then a topological sort of such dependencies will be used to determine the order of starting services. The topological sort will also be used to determine the order of executing the pre-start and post-start callbacks of plugins. For stopping the application, the topological sort order will be used in reverse.

Figure 3:
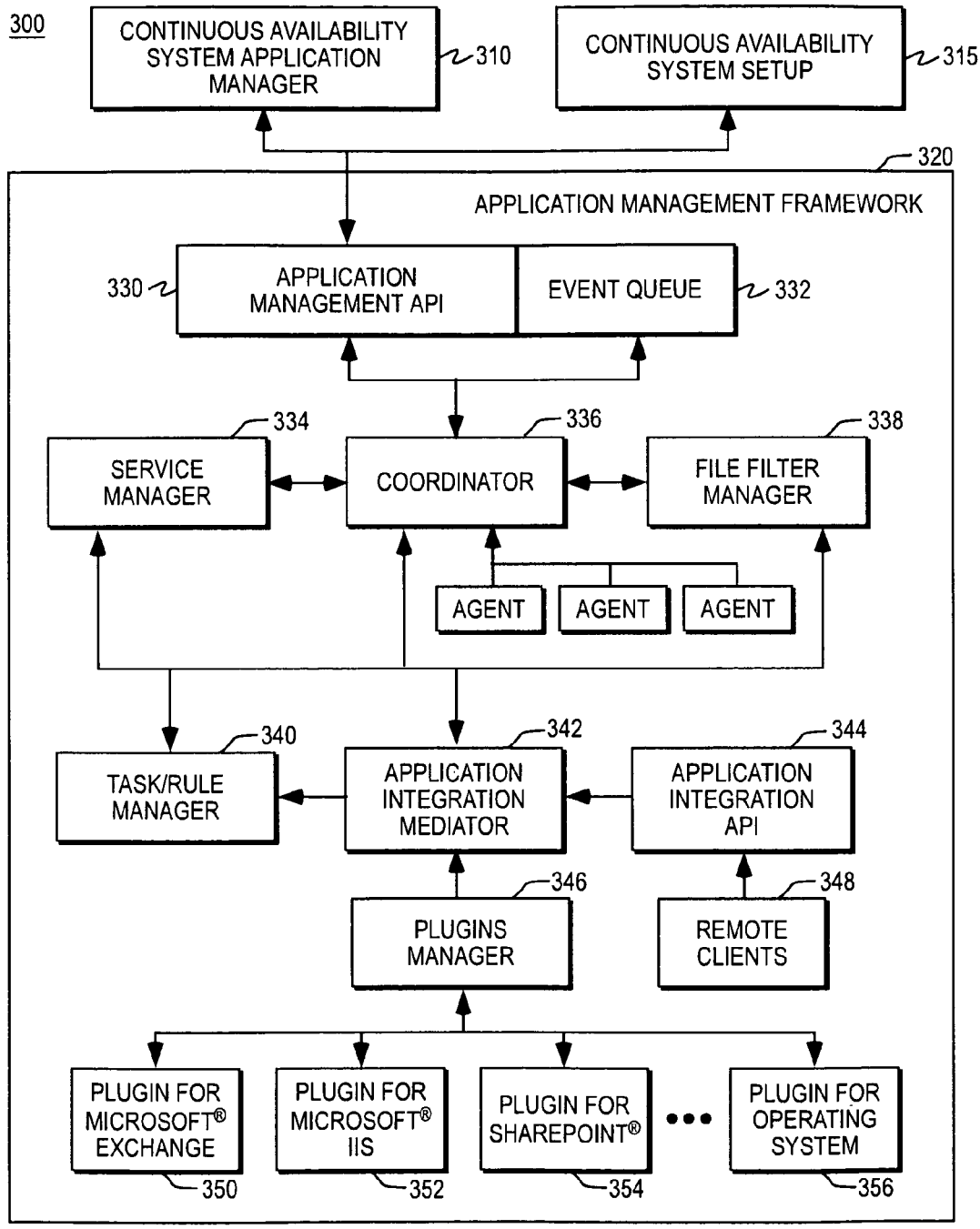
FIG. 3 illustrates one embodiment of an architectural diagram of an application management framework element for a node that is one of a plurality of nodes forming a continuous availability protected node group.

FIG. 3 illustrates one embodiment of an architectural diagram 300 of an application management framework element for a node that is one of a plurality of nodes forming a continuous availability protected node group. The top-level components and their main roles and interactions are indicated in FIG. 3 and include three API's. The three API's include the Application Management API 330, a Plugin API (implicit but not shown) and an Application Integration API 344 associated with a Remote Client 348.

The application management framework software 320 includes an Application Management API 330 that provides an external interface to Continuous Availability System Application Manager 310 and Continuous Availability System Setup functions 315. It is the main interface by which the application management framework software 320 is integrated into continuous availability software.

The connection to the Continuous Availability System Application Manager 310 from the Application Management API 330 provides means for the Continuous Availability System Application Manager 310 to instruct the application management framework software 320 to start, stop and monitor applications, to determine the current set of filters, and to configure tasks and rules. The Event Queue 332 provides means for this communication to be conducted in an asynchronous manner. The Application Management API 330 also communicates with the Continuous Availability System Setup 315 in order to allow plugins, and hence application protection, to be available from the moment of first installing the continuous availability software.

Not shown but implicit is a Plugin API that enables plugins to override methods for initialization, starting and stopping, and updating file filters, registry filters and services. The Plugin API also enables definition of tasks, rules and counters. Plugins allow the code associated with managing, monitoring and protecting of an application in a continuous availability system to be defined in a consistent way and efficiently integrated with the continuous availability software. They define a set of methods that will be invoked by the application management framework software 320 at the appropriate time, such as to enumerate file filters, perform actions on start, check performance rules, etc. Plugins are generally, but not exclusively associated with protected applications. For example, there will be a system plugin that defines system monitoring. Typical plugins shown in FIG. 3 include plugins associated with Microsoft® Exchange 350, Microsoft® Internet Information 352, Microsoft Share-Point® 354, and the operating system 356.

A third interface to the application management framework software 320 is the Application Integration API 344 that handles communications with Remote Clients 348. Remote Clients 348 provide a functionality that is not suitable for plugin integration. In some cases, an interface is required that is invoked by an external process, such as an application which itself provides an integration mechanism (e.g., Microsoft® Exchange store events). The application management framework 320 defines remote client interfaces that are available via a remote procedure call mechanism such as COM or .NET(CLR). The Application Integration API 344 is used by external applications, such as one that provides node checks, optimization and performance evaluation. This API may be used as an alternative for applications that provide a hooking mechanism of their own, such as a database trigger for filter change. It may also provide a mechanism for integrating third party monitoring tools.

Plugins are loaded, unloaded, and introspected by the Plugins Manager 346. The Application Integration Mediator 342 provides a unified API for specifying filters, services, tasks and rules that can be used both by plugins via the Plugins Manager 346 and by other Remote Clients 348 using a remote-procedure call interface via the Application Integration API. While the Application Integration Mediator 342 is the basis for the Application Integration API 344 and Plugin API, it routes calls arriving from them to an appropriate component. The Coordinator 336 aggregates the other components, and coordinates the operation of other components for operations such as application starting and stopping.

For example, an AddApplication call goes to the Coordinator 336, a ProtectService call goes to the Service Manager 334, and an AddFilter call goes to the File Filter Manager 338. The Coordinator 336 functions together with its set of application Agent 358, 360, 362 that define properties associated with each sponsor, such as its name, and the times within which the application associated with the sponsor should be able to start and stop, outside of which the application is deemed to have failed to start or stop. The Coordinator 336 performs as a task scheduler. For example, it may translate a start call via the Application Management API 330 into running the appropriate tasks and calls to the Service Manager 334.

When multiple applications are protected simultaneously in a continuous availability system, it is necessary to coordinate potentially shared resources, such as services and file filters. This is accomplished using the concept of sponsors. Thus, a particular plugin that adds a file filter results in the plugin being a sponsor for the file filter. Sponsorship may be granted or withdrawn. If a plugin is removed, then its sponsorship is withdrawn from all resources such as tasks, protected services, data filters and rules.

The Service Manager 334 performs similar actions to the File Filter Manager 338, but for protected services, as well as service monitoring. The Service Manager 334 handles all services used by protected applications in a continuous availability system. The majority of the protected applications are implemented as one or more software services. These services are generally started on an active node when the associated application is started or stopped on a protect node. Similar to filters, services have application sponsors and can be defined by either explicitly adding or removing them, or by enumeration.

The File Filter Manager 338 performs filter comparison, optimization, validation and sponsorship tracking. It grants and withdraws sponsorship of filters. File filters define the files that are to be protected and the files that are to be excluded from protection. Each filter has one or more sponsors associated with it, which are typically the names of protected applications. Sponsorship is used to determine when a file filter will be removed, such as when it is no longer referenced by an application. When naming the sponsor of a filter, a sub-sponsor may also be specified. The sole purpose of this configuration is to specify the groups for finer grained restoration of data.

File filters may be specified by either explicit insertion or deletion, or by enumeration. Sponsorship of filters may be tracked, so that if a second application adds the same filter, and then removes it, it will still be present until all applications have removed it, or more correctly, removed sponsorship of it. Effective filters are those actually in use for synchronization and replication, and are calculated from sponsored filters by removing duplicate filters, invalid filters, and subset filters.

By explicitly adding or removing filters, the File Filter Manager 338 maintains a current set of filters. The current set of filters may vary over time. The plugins may also enumerate all the filters that are currently applicable, in response to a request from the application management framework software 320. It then becomes the responsibility of the application management framework software to track changes in the filter set. The application management framework software may compare enumerated filters with current definition, and invoke add/remove filters accordingly. Certain application require that filters be declared as "sticky", which means that they will not be removed automatically if they are not mentioned in a subsequent enumeration, but must be explicitly removed. When all the filter definitions have been collected from the plugins, they may be optimized to remove redundancies.

The Task/Rule Manager 340 contains application availability tasks specified by plugins as callbacks and by the administrative user as shell commands in addition to any application availability rules which can trigger actions dependent on the results of evaluating the rules. The various procedures that are associated with managing an application's availability are collectively termed tasks. There are standard task types associated with virtually all applications, such as actions to perform on startup, or for enumerating file filters. The application management framework software 320 may also define custom tasks that may be invoked periodically, or may be invoked in response to monitoring rules. Tasks may be implemented as methods in a plugin or as shell commands. Standard tasks implemented by plugins that may override the PluginBase class methods include pre-start, post-start, pre-stop, post-stop, file filter enumeration, registry filter enumeration, service enumeration, periodically on active node and periodically on protect node. Plugins may also define custom tasks by marking them with a "task attribute". This allows them to define a display string, which may also contain markers for parameters that will be alterable by an administrative user.

Tasks may also be triggered by an action invoked in response to a rule firing and a response to application event recognition. Tasks may also enable customized actions such as network configuration, actions to perform before or after creating a snapshot of disk volumes, or actions to perform in response to the triggering of a rule. The Task/Rule Manager 340 provides two class hierarchies including Task Type for defining when a task is run and Task Implementation for defining how a task is run.

An Abstract Task may be a sequential task for start/stop/network/rule action, etc., or it may be a periodic task used for service monitoring, filter discovery, etc. A Periodic Rule may be a timed rule used for rules with duration, or a latched rule used for run-once or one-shot rules. In one embodiment, there are three categories of rules, including latched rules, timed rules, and log-watcher rules. The rule category is indicated by an appropriate attribute. Timed rules will only invoke their associated actions if their conditions have been met for the specified duration. Latched rules will fire as soon as their condition is first met, but will not fire again until their reset period has expired. Log-watcher rules provide a means for recognizing and responding to event log entries, as discussed below.

Application availability rules are used to define monitoring for applications or the system as a whole. The plugins may define arbitrary monitoring rules, such as checking free space on a disk, performing a ping check, or checking that an email can be sent. By defining rules that contain a state history, rules for trend analysis may be implemented. A set of possible actions in response to a rule firing may be extended from restart, switch, etc. as plugins may define arbitrary actions. Rules may also provide an integration path for allowing external applications, such as monitoring tools, to invoke actions within a continuous availability system.

Application availability rules comprise a Boolean condition function and one or more actions. A rule may define multiple actions. Rules are defined as plugins using an attribute that gives the display string for the rule and the default actions associated with the rule. The attribute is associated with a condition function that is a Boolean method that implements a check for the rule. As for tasks, the display string for rules may contain zero or more parameters. Rules are checked periodically at an interval that is configurable by an administrative user. The frequency with which a rule is evaluated or checked may be specified for each individual rule.

The application management framework software 320 also provides a different category of rule for application monitoring and integration, such as discrete state transitions, as opposed to changes in performance measurements. Events may include entries in a Microsoft Windows® event log, explicit hooking of application event API's, and deducing application behavior from syntactic pattern recognition of file update patterns. Log-watcher rules provide means for recognizing and responding to Microsoft Windows® event logs entries, and are defined by an attribute in an associated plugin.

Other categories of rules may include custom actions defined by an associated plugin to provide customized responses to event log entries.

Some applications provide API's that allow callbacks to be invoked when an application event occurs. This code cannot be implemented in a plugin, since it is effectively a plugin to the application itself. The means for including these actions into the application management framework 320 is via the Remote Client interface 348 to invoke tasks defined in plugins in response to the event. In some cases, syntactic pattern recognition is used to deduce a particular state transition by observing patterns in its external behavior. For example, checkpoints events may only be discernable by observing patterns in file updates performed by an application.

Figure 4:
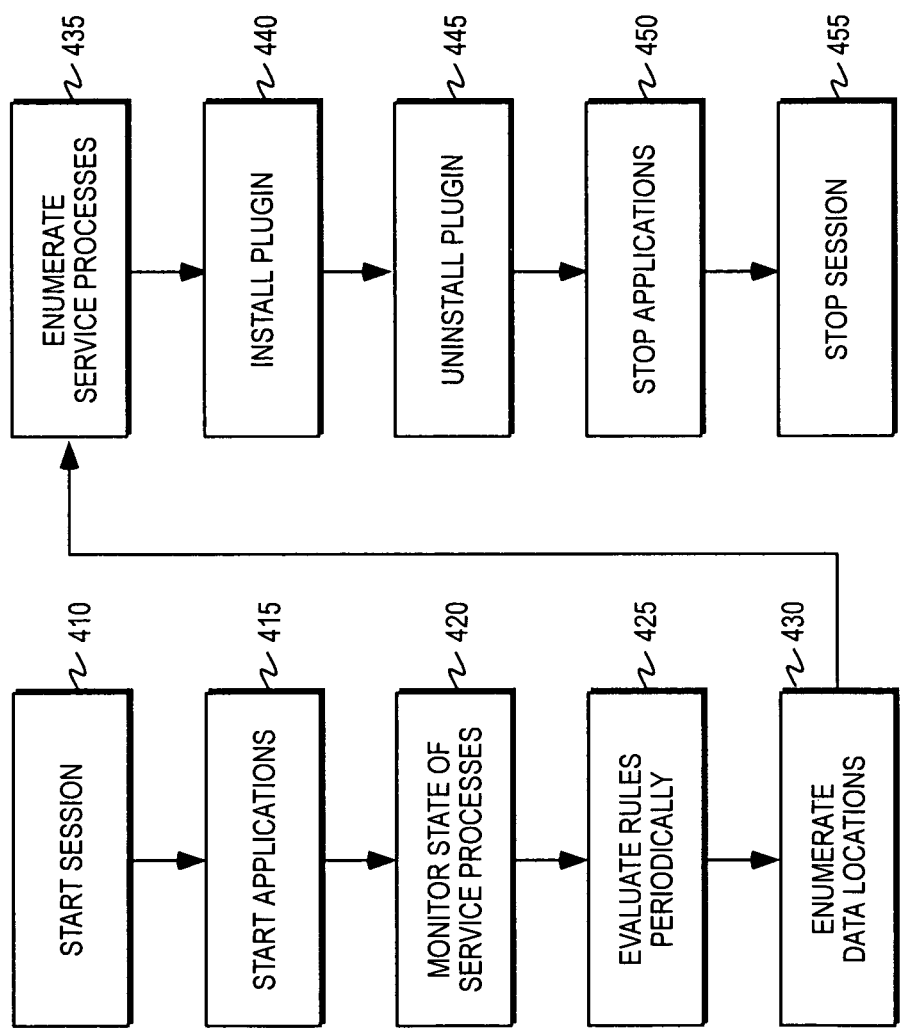
FIG. 4 illustrates one embodiment of application management framework element operations that may take place on an active node of a continuous availability node group.

FIG. 4 illustrates one embodiment of application management framework element operations 400 that may take place on an active node of a continuous availability node group. The active and protect nodes of a continuous availability system may be operating in parallel. The operations executed by a node between a start and stop operation is a "session", during which other operations may occur repeatedly.

Figure 5:
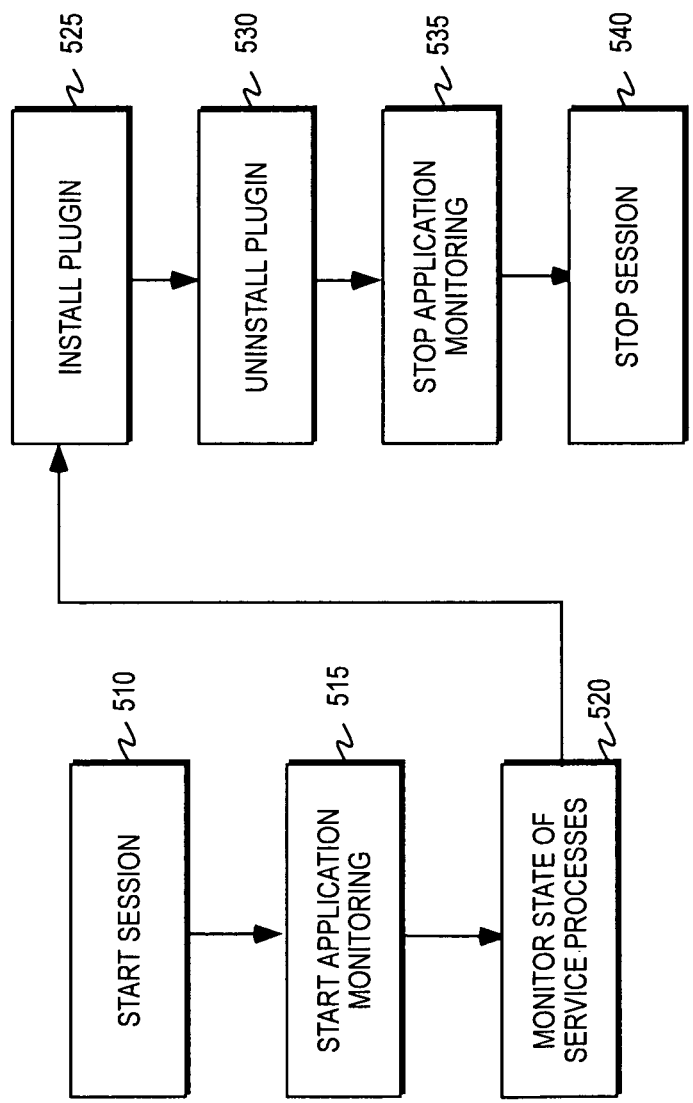
FIG. 5 illustrates one embodiment of application management framework element operations that may take place on a protect node of a continuous availability node group.

Starting a session on an active node 410 is synchronized with starting a session on a protect node (see 510 in FIG. 5), and a step of stopping a session on an active node 455 is synchronized with a step of stopping a session on a protect node (see 540 in FIG. 5). There may be multiple start and stop sessions during a run of the continuous availability software, and the roles of the active and protect node may swap between nodes. The steps between starting a session on an active node 410 and stopping a session on the active node 455 bracket the other operations, which can occur repeatedly within the session.

At the startup of the Application Management Framework software 410 on an active node, a current set plugins is loaded into the system. The applications are then started on the active node 415 and the current state of services processes are monitored periodically 420.

The rules are evaluated periodically 425 while the applications are running, and the periodic scheduling of the rules is performed by the Application Management Framework by calling the appropriate rule callback in a plugin to perform the evaluation. The data locations are enumerated periodically 430, and the periodic scheduling is performed by the Application Management Framework by invoking the appropriate callback in each plugin. The service processes are then periodically enumerated 435, and the periodic scheduling is performed by the Application Management Framework by invoking the appropriate callback in each plugin.

Plugins may be installed and added to the current set of plugins 440 on an ad-hoc basis in response to an administrative user request. Plugins may also be uninstalled and removed from the current set of plugins 445 on an ad-hoc basis in response to an administrative user request. The applications may be stopped on the active node 450, and the current session stopped 455.

The step of starting applications 415 and application monitoring on the active node will typically be initiated because of switchover or failover to the present node. This operation required execution of the following sub-operations in the specified order: execution of network configuration tasks; execution of pre-service start tasks; starting services; execution of post-service tasks. Within each of the task categories, any sponsor dependencies that have been specified by plugins are used in order to perform a topological sort of the sponsors, and this order is used to determine the ordering of tasks. For starting services, the following ordering criteria are used: service dependencies as known to the operating system; sponsor dependencies; sort order hint. These criteria are used as follows: sponsors are topologically sorted according to any dependencies between them. For the first sponsor in the list, its services are sorted by service order hint. For the first service in the list; if it depends on any other services, these are started, followed by the service itself. This procedure is repeated for subsequent services and subsequent sponsors. The set of services will also contain any services that are dependent upon the services specified directly by plugins or remote clients. Those that are marked as "Managed" will also be started in the course of this operation. Note that the term "started" is actually shorthand for saying "caused to enter the running state specified for an active node of the continuous availability computer group, which is typically that the service will be running.

After the specified sub-operations have been completed, then the periodic tasks for the active node will be scheduled. These comprise service state monitoring, rule evaluation, filter enumeration, service enumeration and any other periodic tasks as specified by the plugins.

The step of periodically monitoring the current stopped/running state of service processes 425 while the applications are running will typically be initiated periodically on active and protect nodes. For each service, where its target running/stopped state for the node role (active/protect) is not "any" then the Application Management Framework will attempt to alter its state if appropriate, and those services that depend upon it.

The step of periodically evaluating rules while applications are running 425 is initiated periodically, according to the time interval configured for each rule. For each rule, the framework invokes the appropriate callback in a plugin, and the callback indicates the current value of the attribute of system or application behavior being monitored (if appropriate) and whether or not the rule has triggered. If the rule triggers, then the framework will invoke the task that has been configured as this rule's action. Plugins can also define "duration" rules that must trigger continually on each invocation for a configurable duration before the action will be invoked.

The step of periodically enumerating all data locations (filters) 430 is required in order to protect all of the data for a particular application, and resolving overlaps with other protected applications. This operation can be initiated either periodically by the Application Management Framework, when it will invoke plugin callback functions to cause them to enumerate the required filters. Alternatively, it can be initiated when a remote client determines that an application's set of files has changed, and invokes the required functions of the framework in order to enumerate the filters. In response to a set of filters being enumerated, the framework will perform the following operations: the enumerated set is compared to the current set of filters that are tagged with the appropriate sponsor. Filters that appear only in the enumerated set are added. Filters that appear only in the current set are removed. Note that "added" and "removed" are shorthand for "have sponsorship by this sponsor added" and "have sponsorship by this sponsor removed" respectively, but only if a filter has no other sponsors will it actually be added or removed. This process results in an updated current set of filters. The new current set of filters is then processed in order to produce a set of "effective filters" that will be passed to the continuous availability software. The set of effective filters is determined by validating filters for correct syntax, and by including only the more general filter where one specifies a subset of the file system names of the other.

The step of periodically enumerating service processes 435 comprises enumerating all of the service processes that comprise a particular application, and resolving overlaps with other protected applications. This operation can be initiated in the course of loading a plugin on an active node or periodically by the Application Management Framework when it will invoke plugin callback functions to cause them to enumerate the services comprising the application and for each service, its intended running/stopped state on active and protect nodes of the continuous availability computer group. Additionally, the operation can be initiated when a remote client determines that an application's set of services has changed, and invokes the required functions of the framework to enumerate the names and states of the services. When a service is specified for protection, the caller can identify the target running/stopped state on active and protect nodes, which will typically be "running" on the active and "stopped" on a protect node.

In response to a set of services being enumerated, the framework will perform the following operations: the enumerated set is compared to the current set of services which are tagged with the appropriate sponsor. Services that appear only in the enumerated set have sponsorship added for this sponsor. Services that appear only in the current set have sponsorship removed for this sponsor. Where a service has no other sponsors, then it will be added or removed. When a service is added, then it will be marked as "explicitly protected", "managed", or "monitored". These markers have the following meanings: "explicitly protected" means the service was directly specified by a plugin or remote client; "managed" means that the service will be stopped and started when the Application Management Framework is instructed by the continuous availability software to start or stop applications on a node; "monitored" means that the Application Management Framework will periodically compare the current running/stopped state of the service to the target state and take corrective action.

When a service is added to the current set, then any service which is "managed" will have its startup type set to "on-demand", and the Application Management Framework will record its startup type at the point of adoption, and also its running/stopped state. This allows these to be restored when the service is no longer being controlled by the Application Management Framework.

When a service is added to the current set of services known to Application Management Framework, then services upon which it depends will also be recursively added with markers set as follows: "explicitly protected" will be false; "managed" will be false; "monitored" will be true. The active target state will be inherited from the explicitly protected service and the protect target state will be "any" meaning the Application Management Framework will not alter the service' state. The services which depend on the explicitly protected service will also be recursively added with markers set as follows: "explicitly protected" will be false; "managed" will be true and "monitored" will be false. The active and protect target states will both be "any". Where a dependent service that is managed is first adopted by Application Management Framework, then it will have its startup type and state altered and recorded as for explicitly-protected services. When a service is removed from the set of services known to Application Management Framework because it has no more sponsors, then where the service is marked as "managed" then its original startup type and running/stopped state will be restored on the active node by the Application Management Framework.

The step of installing and adding a plugin to the current set of plugins 440 includes a number of functionalities. Each plugin specifies a "sponsor name" that is a string with which the framework will tag all rules, tasks, filters and services specified by the plugin. This string uniquely identifies the plugin. Typically, it will be the name of the application that the plugin is intended to protect. Plugins can define one or more auxiliary files that are required in order for the plugin to execute. These typically include application API adapter libraries. Plugins can also define start and stop timeouts associated with their application. Plugins may define a callback that, on invocation, performs a series of pre-install checks to determine that it can protect its associated application and return the results of these checks. For example, a pre-install check might ensure that the application is actually installed and that protection for the installed version is supported. Plugins can define a callback that, on invocation, will enumerate the location of protected data as file system filter expressions, and similar callbacks for other storage media, such as a registry. Plugins define a callback that, on invocation, will enumerate the service processes comprising the application, and their expected running/stopped state on active and protect nodes of a continuous availability computer group. Plugins can define rules as callbacks that, on invocation, will check some aspect of system or application operation, and return a trigger result to the framework if the rule triggers.

Plugins can define tasks as callbacks that will be invoked periodically or in response to a rule triggering, or pre/post starting/stopping of services. These will be registered with the framework on successful loading of a plugin. Plugins can be dynamically loaded by the framework. When a plugin is loaded by the framework, the framework determines (e.g., by means of well-known entry points and reflection) the tasks, rules, and other callbacks and attributes defined by the plugin. The plugin is loaded into the framework on the active node and the protect node.

When a plugin is loaded, its pre-install checks will be invoked. If these are successful, the framework will request that the host continuous availability software distributes the code of the plugin and auxiliary files to all other nodes. When the plugin has been installed on all nodes, then on the active node, the framework will invoke the plugin's service enumeration callback, execute pre-install checks (which are subsequent to service enumeration), then execute the service monitoring operations which will start any additional services resulting from the enumeration. Next, the framework will invoke the plugin's filter enumeration callbacks to determine the application's protected data requirements, and perform the operations specified below which are subsequent to filter enumeration. Finally the framework will schedule any periodic tasks or rules defined by the plugin.

The step of uninstalling a plugin 445 is typically initiated by the administrative user. Uninstallation comprises the following sub-operations: firstly, sponsorship is withdrawn for the sponsor associated with the plugin from tasks, rules, filters and services. For sponsored items that may have only one sponsor, such as tasks and rules, then the item is deleted from the framework. For sponsored items that may have a plurality of sponsors, such as filters and services, then the item is removed if and only of it has no remaining sponsors. In the case of services, a further operation is performed based on the technique of mark and sweep garbage collection. This is necessary following withdrawal of the plugin's sponsorship because there may be one or more groups of services remaining that are sponsored solely because of dependency relationships between them but for which no service in the group is sponsored by an application sponsor. In order to identify these "service islands" the following operation is performed by the framework: all services are marked for deletion. Each service which is marked as explicitly protected, that is was enumerated by a plugin, is marked as "not for deletion". Recursively, any service which depends-on or is depended on by explicitly protected services is marked "not for deletion". Following this, any service still marked for deletion is removed from the framework.

The step of stopping applications on an active node 450 consists of executing the following sub-operations in the specified order: stopping scheduling of periodic tasks; execution of pre-service stop tasks; stopping services; execution of post-service stop tasks. Within each of the task categories, any sponsor dependencies that have been specified by plugins are used in order to perform a topological sort of the sponsors, and the reverse of this order is used to determine the ordering of tasks.

For stopping services, the following ordering criteria are used: service dependencies as known to the operating system; sponsor dependencies; sort order hint. These criteria are employed in the following manner: sponsors are topologically sorted according to dependencies, and the resulting ordering is then reversed. For the first sponsor in the list, its services are sorted by service order hint. This ordering is then reversed. The services are then stopped in this order. This procedure is repeated for subsequent sponsors.

FIG. 5 illustrates one embodiment of application management framework element operations 500 that may take place on a protect node of a continuous availability node group.

The active and protect nodes of a continuous availability system may be operating in parallel. The operations executed by a node between a start and stop operation is a "session", during which other operations may occur repeatedly. A step of starting a session on a protect node 510 is synchronized with a step of starting a session on an active node (see 410 in FIG. 4), and a step of stopping a session on a protect node 540 is synchronized with a step of stopping a session on an active node (see 455 in FIG. 4). There may be multiple start and stop sessions during a run of the continuous availability software, and the roles of the active and protect node may swap between nodes. The steps between starting a session on a protect node 510 and stopping a session on the protect node 540 bracket the other operations, which can occur repeatedly within the session.

At the startup of the Application Management Framework software 410 in a protect node, a current set of plugins is loaded into the system. The applications are not started on the protect node, but any application monitoring tasks that need to check the state of the protect node are run 515. For example, an application monitoring task might check that there is sufficient disk storage to support the application when it runs. The current state of dependent services for the application is also monitored 520. An example of dependent services for the application would be an operating system service needed to support the application. Plugins may be installed and added to the current set of plugins 525 on an ad-hoc basis in response to an administrative user request. Plugins may also be uninstalled and removed from the current set of plugins 530 on an ad-hoc basis in response to an administrative user request. The applications may be stopped on the protect node 535, and the current session stopped 540.

The step of starting full application monitoring on a protect node 515 will typically be initiated following a switchover or failover. This operation consists of scheduling monitoring of service state, and any periodic tasks or rules that have been defined to run on a protect node.

The step of periodically monitoring the current state of services processes 520 will typically be initiated periodically on active and protect nodes. For each service, where its target running/stopped state for the node role, active or protect, is not "any" then the Application Management Framework will attempt to alter its state, and those services that depend upon it.

The step of installing a plugin on a protect node and adding a plugin to the current set of plugins 525 includes a number of functionalities which have previously been described with respect to block 440 of FIG. 4.

The step of uninstalling a plugin 530 is typically initiated by the administrative user and has been described above with respect to block 445 of FIG. 4.

The step of stopping application monitoring on a protect node 535 will typically be initiated prior to a switchover or failover to this node. This operation consists of stopping currently scheduled periodic service monitoring or other tasks and rules.

Figure 6:
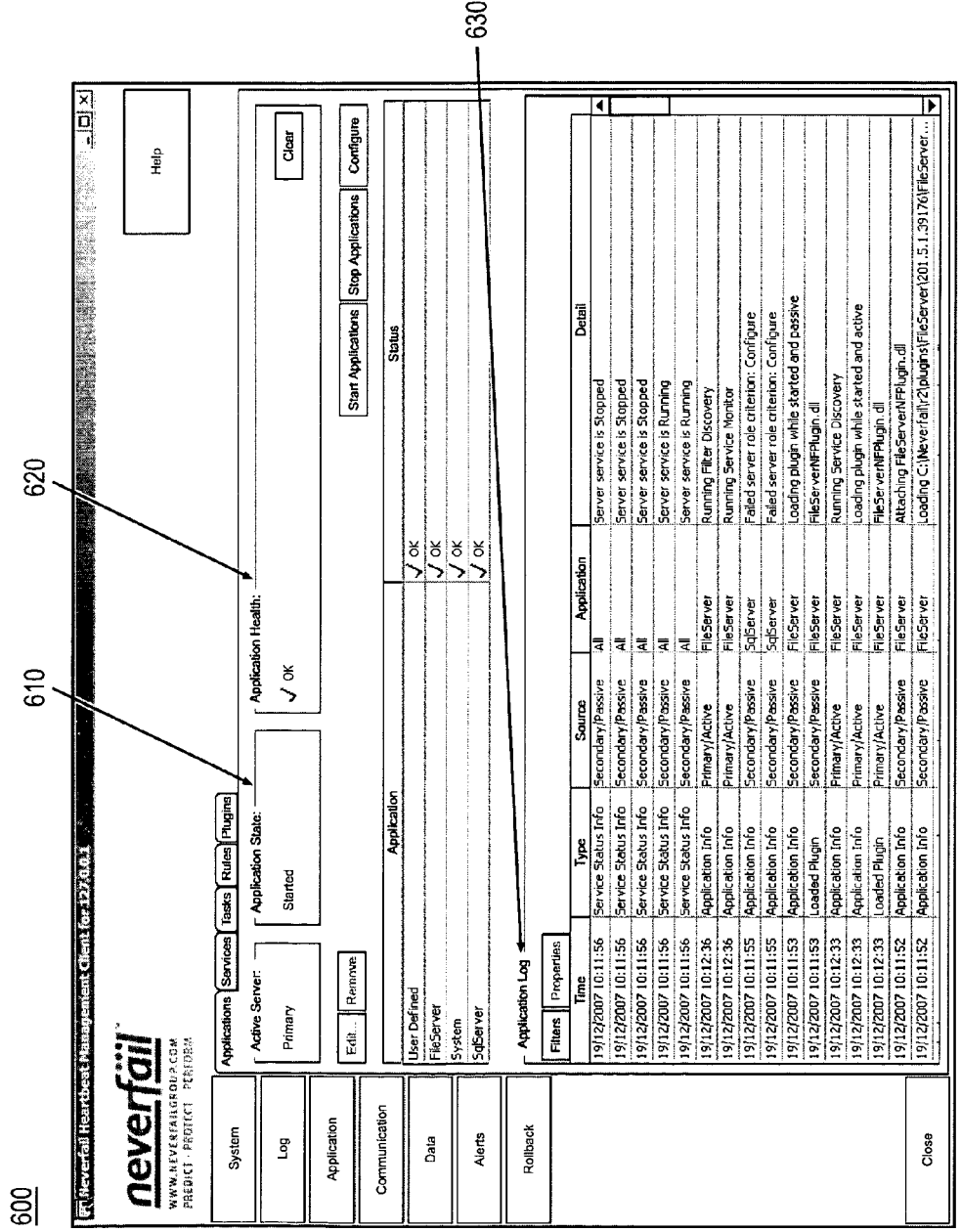
FIG. 6 illustrates one embodiment of a graphical user interface for an application management framework.

FIG. 6 illustrates one embodiment of an application management overview graphical user interface (GUI) 600. This screenshot shows the current started/stopped state of applications 610, their state of health as determined by monitoring 620, and an historical log application status 630. The administrative user may also elect to start or stop protected applications from this screen.

Figure 7:
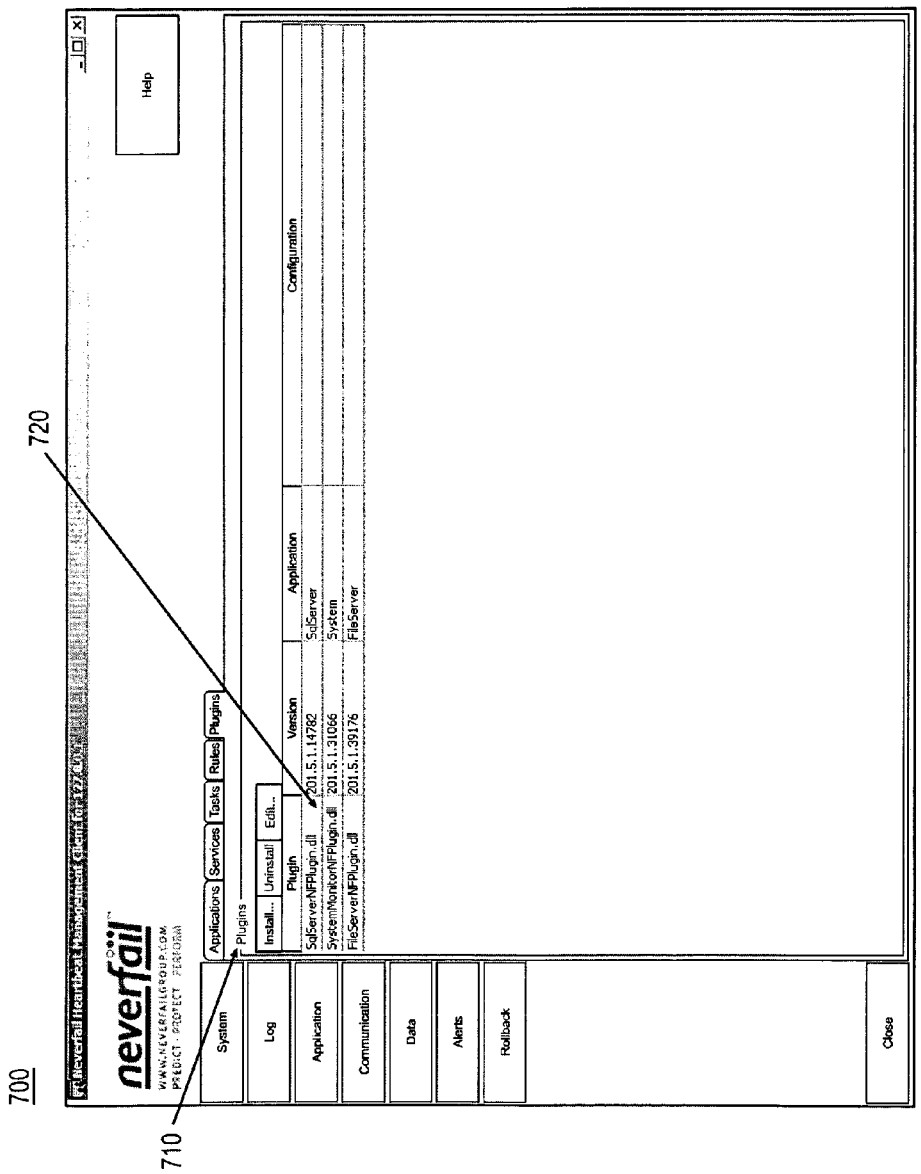
FIG. 7 illustrates one embodiment of a graphical user interface for managing plugins for the application management framework.

FIG. 7 illustrates one embodiment of a graphical user interface (GUI) 700 for managing plugins for the application management framework. This screenshot shows installed plugins 720. The administrative user may install additional plugins 710, or remove existing ones.

Figure 8:
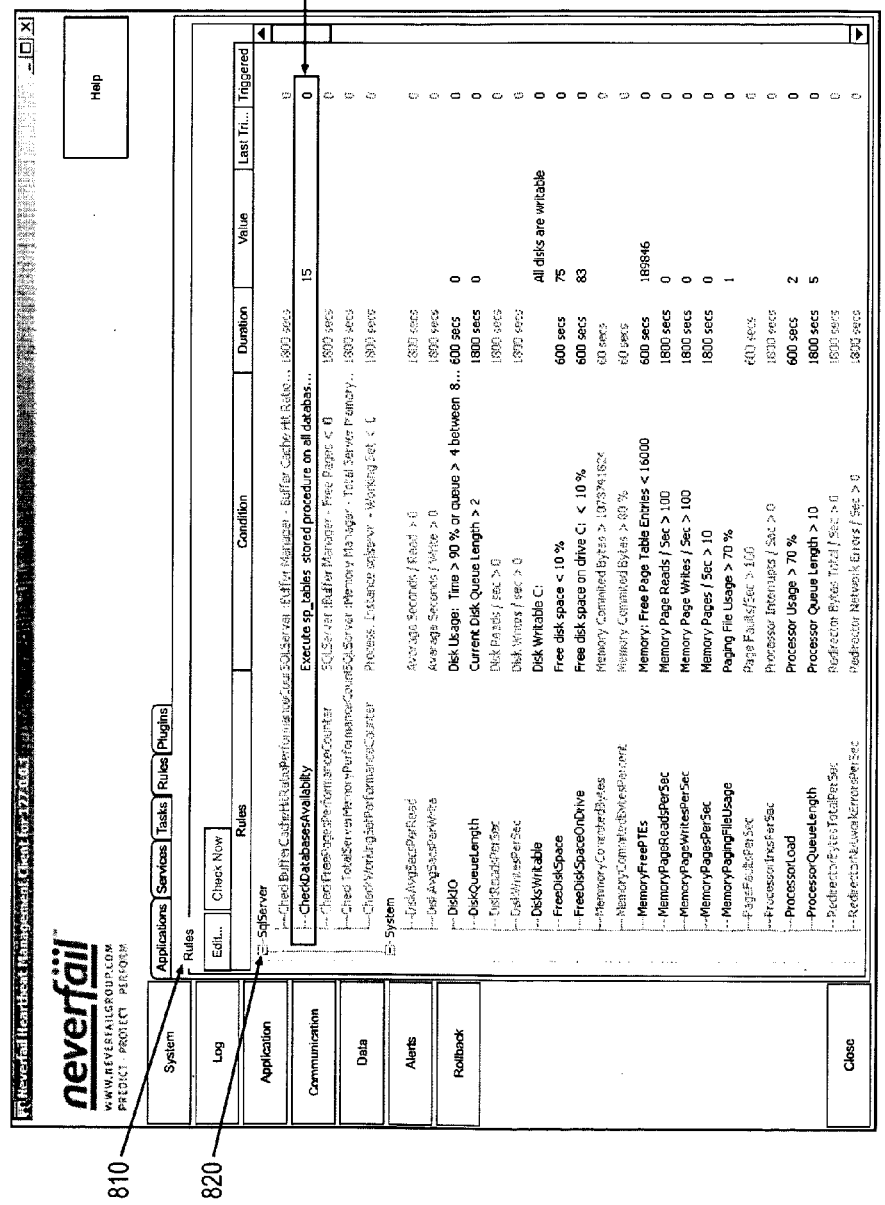
FIG. 8 illustrates one embodiment of a graphical user interface for managing plugin rules.

FIG. 8 illustrates one embodiment of a graphical user interface 800 for managing plugin application availability rules. This screenshot shows application and system monitoring rules 810 grouped by sponsor 820, and each rule's current status and configuration 830. The administrative user can alter the configuration of rules, such as a threshold value, or the action taken in response to the rule triggering.

Figure 9:
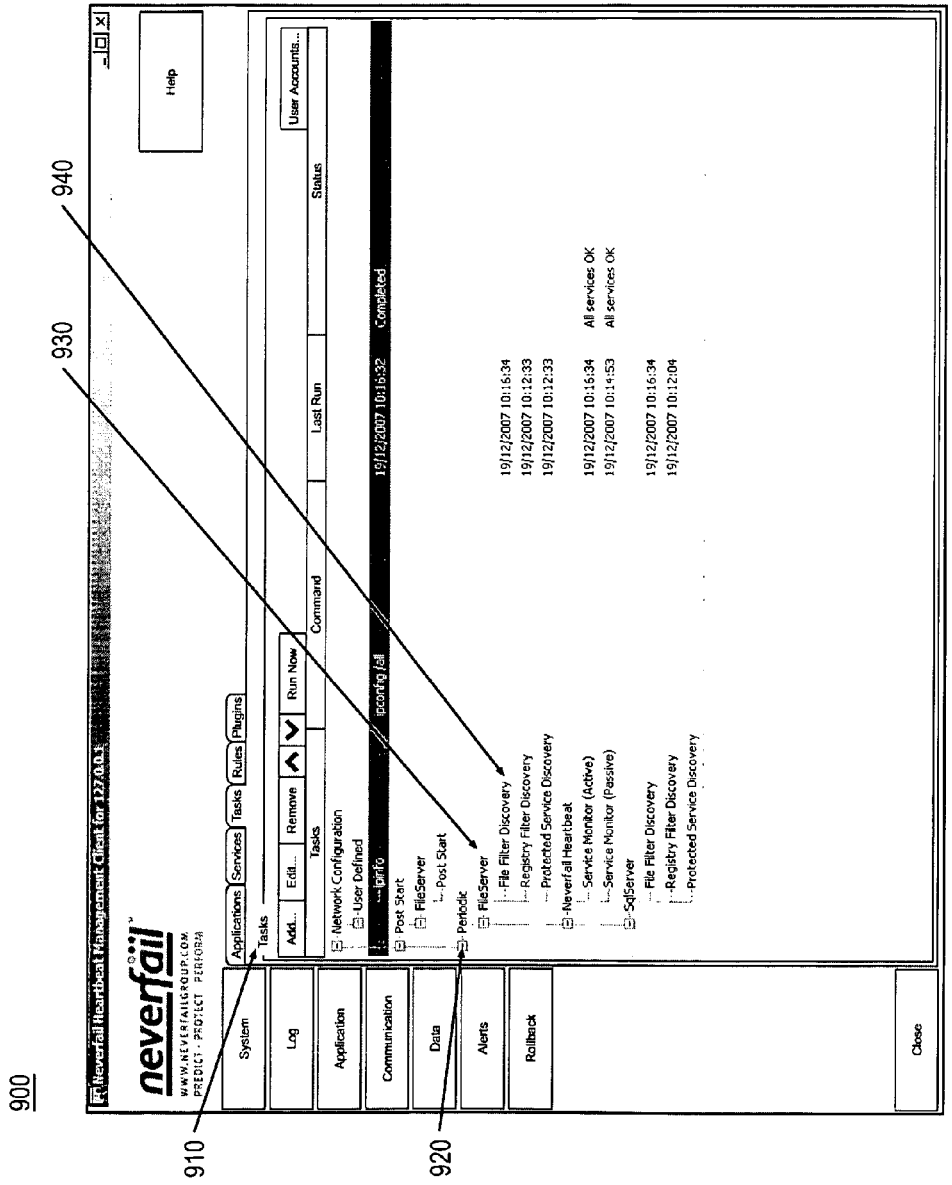
FIG. 9 illustrates one embodiment of a graphical user interface for managing tasks.

FIG. 9 illustrates one embodiment of a graphical user interface 900 for managing application availability tasks 910. This screenshot shows tasks 940 associated with applications 930. These include periodic tasks 920 such as monitoring the state of application services, monitoring the set of data in use by an application, as well as tasks that plugins may define as additional operations to be performed on starting or stopping applications.

Figure 10:
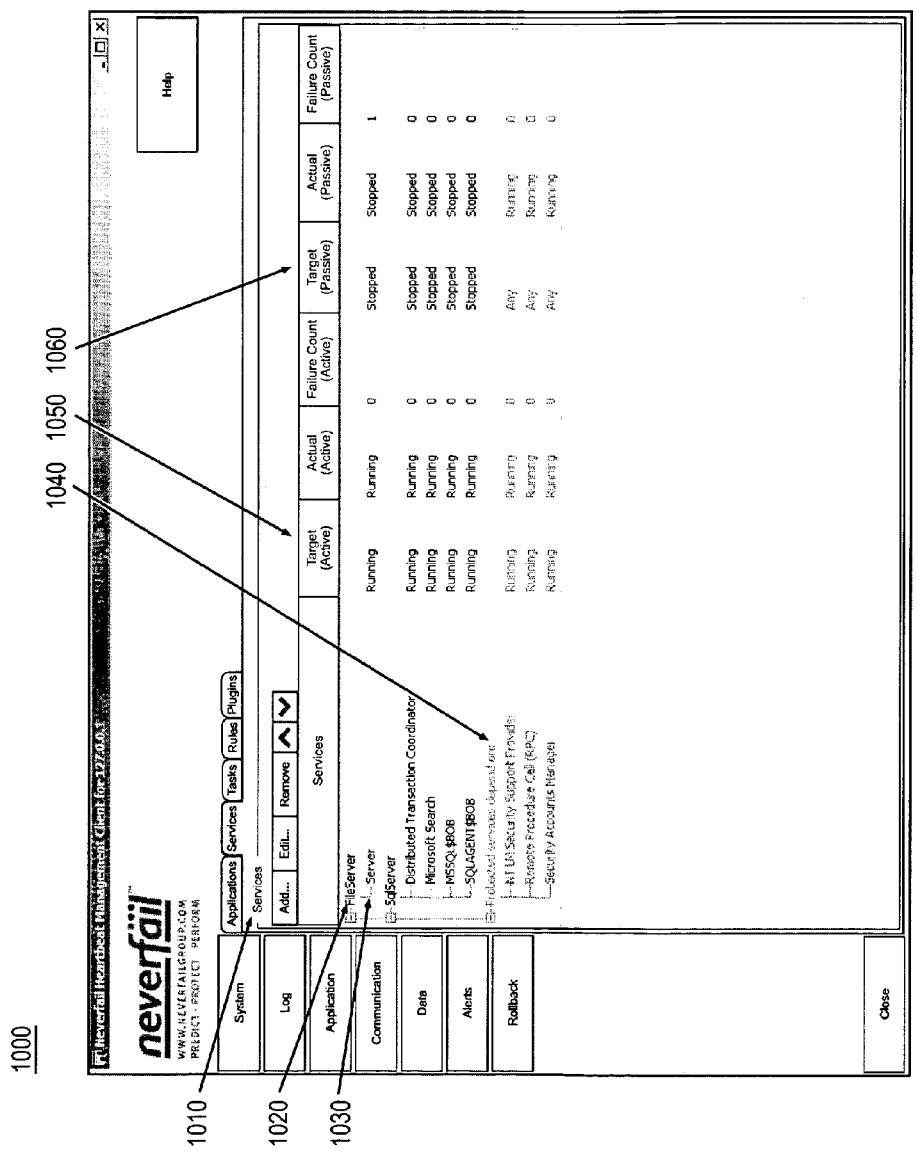
FIG. 10 illustrates one embodiment of a graphical user interface for managing application management services.

FIG. 10 illustrates one embodiment of a graphical user interface 1000 for managing application dependent services. This screenshot shows status 1050, 1060 of application services 1010 (protected services) on active nodes 1050 and protect nodes 1060. Services 1030 are organized by the application 1020 they are associated with. Plugins determine the set of application services and their target state (typically running on the active node and stopped on the protect node). This screen also shows any application dependent services 1040. The Application Management Framework determines the appropriate target state and start/stopping action for these related services.

Figure 11:
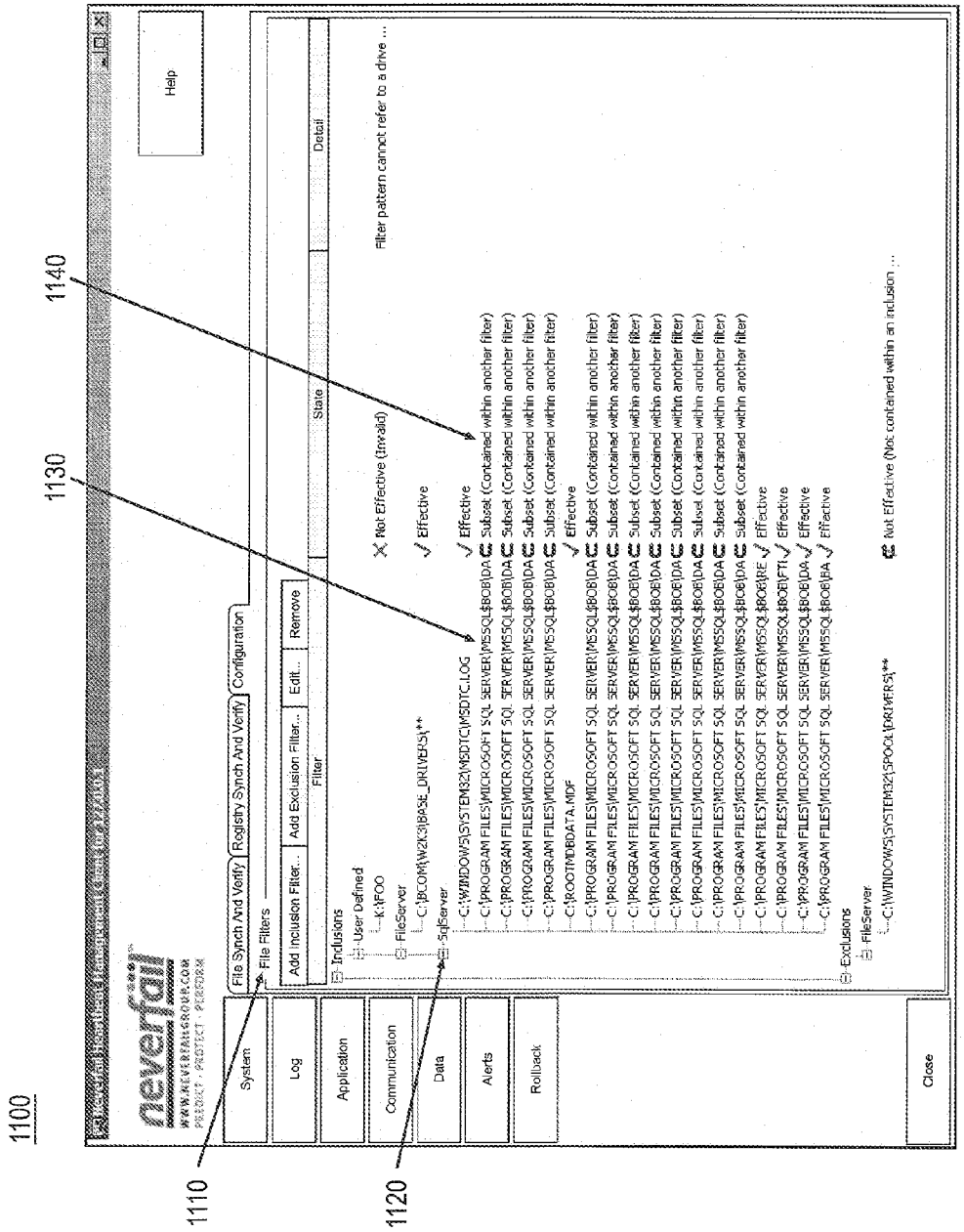
FIG. 11 illustrates one embodiment of a graphical user interface for managing file filters associated with the application management framework.

FIG. 11 illustrates one embodiment of a graphical user interface 1100 for managing application file filters associated with the application management framework. This embodiment illustrates the set of filter expressions 1110 defining the data to protect as specified by plugins. The filter expressions are organized by application 1120. Individual filter expressions 1130 have an associated status 1140 resulting from an analysis performed by the Application Management Framework. The filter expressions set may be deemed effective. The filter expressions set may alternatively be identified as a subset of another filter expression and thus redundant. The filter expressions set may alternatively be identified as invalid in case of problems such as syntax errors.

Figure 12:
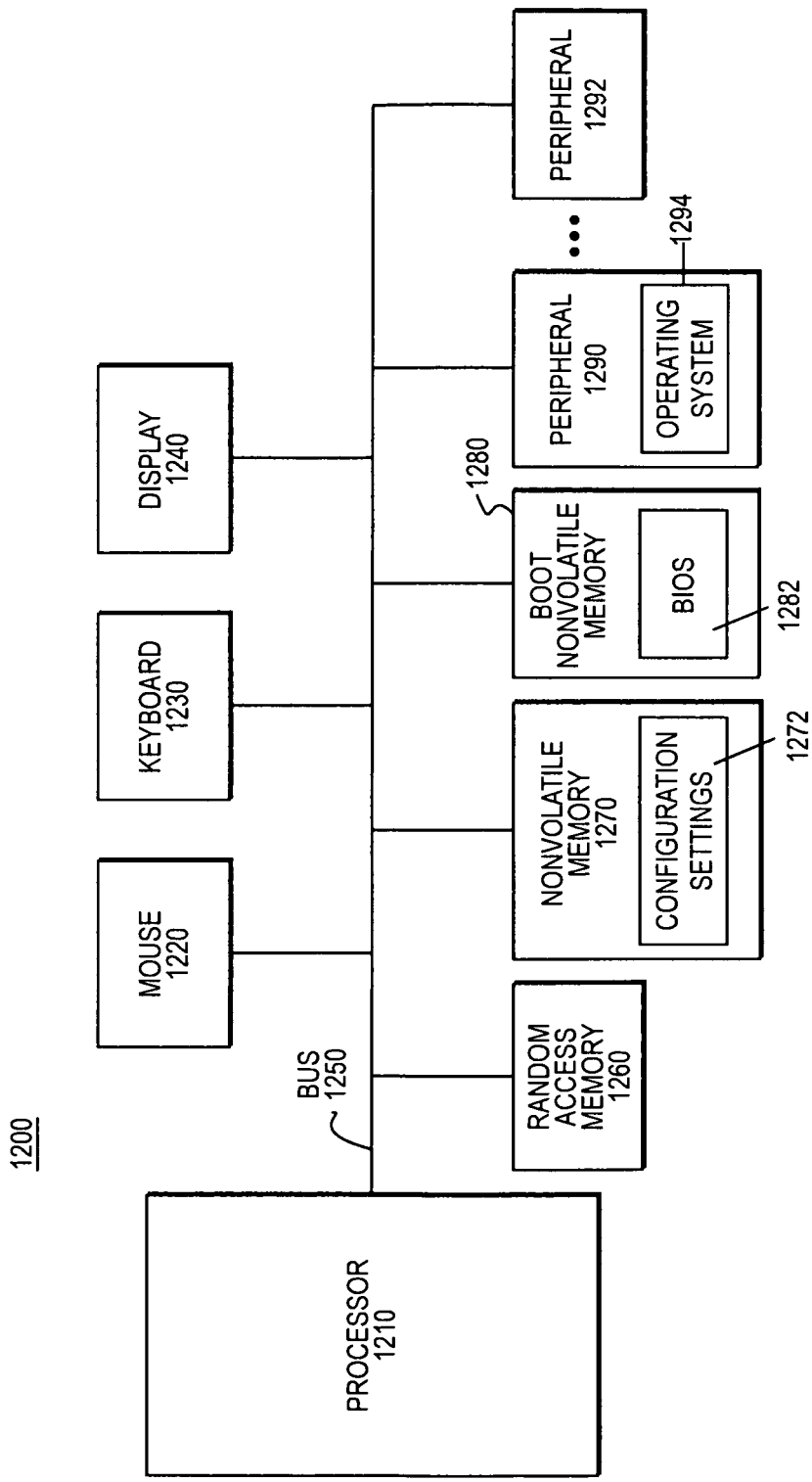
FIG. 12 illustrates one embodiment of a computer system architecture.

FIG. 12 illustrates one embodiment of a generic computer system architecture. The computer system need not necessarily have all of the illustrated components in order to function as a computer node.

Computer 1200 includes processor 1210. Input devices such as mouse 1220 and keyboard 1230 permit the user to input data to computer 1200. Information generated by the processor is provided to an output device such as display 1240. Computer 1200 includes random access memory (RAM) 1260 used by the processor during program execution.

RAM 1260 is typically a volatile memory and does not retain its contents once power is removed from the computer system. Computer 1200 includes nonvolatile memory 1270 for storing configuration settings 1272 even when the computer is powered down. Often parameter information that identifies specific features of the input/output devices is stored in nonvolatile memory 1270. For example, parameter information might describe the number of disk drives, disk drive type, number of heads, tracks, amount of system RAM, etc. as well as the sequence in which peripherals are accessed when attempting to boot the computer (peripheral boot sequence). Typically, nonvolatile memory 1270 is a semiconductor-based memory. Various types of nonvolatile media including electrically erasable programmable read only memory (EEPROM), flash electrically re-writable memory, and battery-backed complementary metal oxide semiconductor (CMOS) are available.

Although occasionally referred to as a boot read only memory (ROM), the boot nonvolatile memory 1280 is typically embodied at least partially as a re-writable nonvolatile memory to permit updates. The boot nonvolatile memory may include routines for communicating with input/output devices in the computer system. In some computer systems these routines are collectively referred to as the Basic Input Output System (BIOS) 1282. The BIOS provides a common interface so that software executing on the processor can communicate with input/output devices such as the keyboard, mouse, nonvolatile mass memory storage device, and other peripheral devices. The boot ROM nonvolatile memory 1280 and the parameter nonvolatile memory 1270 need not be distinct memories.

Mouse 1220, keyboard 1230, display 1240, RAM 1260, nonvolatile memory 1270, and boot nonvolatile memory 1280 are communicatively coupled to processor 1210 through one or more buses such as bus 1250.

The computer also has one or more peripherals 1290 such as a floppy drive, a hard drive, or an optical drive that supports nonvolatile storage. Typically the operating system 1294 is stored in nonvolatile memory. Compact disks (CDs) and Digital Video Disks (DVDs) are examples of media used with optical drives. Other peripherals may be provided. For example, peripheral 1292 may function as a network interface to enable the computer to interface and communicate on the network of FIG. 1.

With reference to FIGS. 1 and 3, the software blocks may be executing on processor 1210. Disk drives 126, 176 correspond to peripheral 1290 in one embodiment. The architecture of FIG. 12 is intended solely to provide a simplistic view of a computer system architecture for a computer that may be used as a node.

Figure 13:
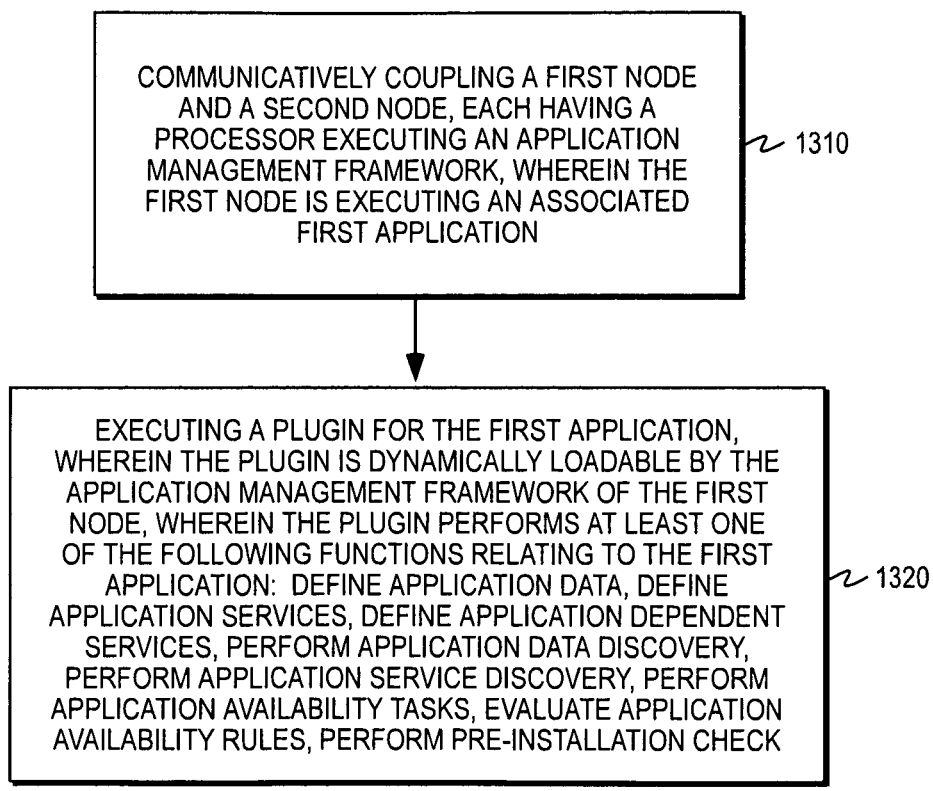
FIG. 13 illustrates one embodiment of a method of supporting continuous availability for a protected node group.

FIG. 13 illustrates one embodiment of a method of supporting continuous availability for a protected node group. In step 1310, a first node and a second node are communicatively coupled. Each of the first and second nodes has a processor executing an application management framework. The first node is executing an associated first application.

In step 1320, a plugin is executed for the first application. The plugin is dynamically loadable by the application management framework of the first node. The plugin performs at least one of the following functions relating to the first application: define application data, define application services, define application dependent services, perform application data discovery, perform application service discovery, perform application availability tasks, perform application availability rules, perform a pre-install check.

Although the present invention has been described in detail with reference to certain preferred embodiments, it should be apparent that modifications and adaptations to those embodiments might occur to persons skilled in the art without departing from the scope of the present invention.

What is claimed is:

1. A method comprising:
   a) communicatively coupling a first node and a second node, each having at least one processor, an executing application management framework, and a first application, wherein the first node is executing its associated first application; and
   b) executing a plugin for the first node application management framework, wherein the plugin is dynamically loadable by the first node application management framework, wherein the plugin specifies at least one application availability rule for protecting the availability of the first application executing on the first node, wherein the application availability rule includes a condition and an action to be performed when that condition is met.

2. The method of claim 1 wherein the first plugin periodically evaluates the application availability rule to monitor the availability of the first application executing on the first node.

3. The method of claim 1, wherein the availability of the first application executing on the first node includes at least one of a current availability, an apparent availability, and an anticipated availability.

4. The method of claim 1 further comprising:
   c) performing a failover from the first node to the second node.

5. The method of claim 4 wherein the failover results from one of an application failure, an operating system failure, and a hardware failure on the first node.

6. The method of claim 5 wherein the application failure is determined by the application availability rule.

7. The method of claim 1 further comprising:
   c) performing a switchover from the first node to the second node.

8. The method of claim 7 further comprising:
   d) performing a switchback from the second node to the first node.

9. The method of claim 1 wherein the first plugin defines one of a start order and a stop order of the first application relative to another application executing on the first node.

10. The method of claim 1 wherein the first and second node are located on a same local network.

11. The method of claim 1 wherein the first and second node are located on distinct local networks.

12. The method of claim 1 wherein the plugin defines an application availability task comprising a sequence of actions.

13. The method of claim 12 wherein invocation of the application availability task causes the condition for executing an action set forth in the application availability rule to be met.

14. The method of claim 12 wherein the application availability task is invoked periodically to perform the sequence of actions.

15. The method of claim 1 wherein the action is identified as an application availability task, wherein the application availability task is defined as a sequence of actions.

16. The method of claim 1 wherein a condition of the application availability rule is defined in part by at least one of an available memory, available disk space, disk utilization, and processor utilization of the first node.

17. The method of claim 1 wherein the plugin specifies application data associated with the first application executing on the first node for protecting the availability of the first application executing on the first node.

18. The method of claim 17 further comprising:
c) replicating the application data to the second node.

19. The method of claim 1 wherein the action does not include replication of data.

20. The method of claim 1 wherein the plugin identifies application dependent services, application service dependencies, and dynamic changes to application services associated with the first application executing on the first node.

21. The method of claim 1 wherein the plugin performs a pre-install check to determine whether the application management framework executing on the first node is capable of providing high availability protection for the first application executing on the first node.

22. The method of claim 1 further comprising:
c) utilizing a graphical user interface to change any of an application service, application data, application availability task, and the application availability rule of the first application executing on the first node.

23. The method of claim 1 further comprising:
c) executing another plugin for the first node application management framework, wherein the another plugin is dynamically loadable by the first node application management framework, wherein the another plugin specifies at least one application availability rule for protecting the availability of a second application executing on the first node, wherein the application availability rule for protecting the availability of the second application includes a condition and an action to be performed when that condition is met.

24. The method of claim 23 wherein the plugin shares at least one plugin resource with the another plugin, wherein the plugin resource is at least one of a file filter, a registry filter, a software service, an application availability task, and the application availability rules.

25. The method of claim 24 further comprising:
c) halting execution of the first application on the first node, wherein any plugin resource utilized solely by the first application is de-allocated.

26. The method of claim 25 further comprising:
d) re-starting execution of the first application on the first node.

* * * * *